Figure 5:
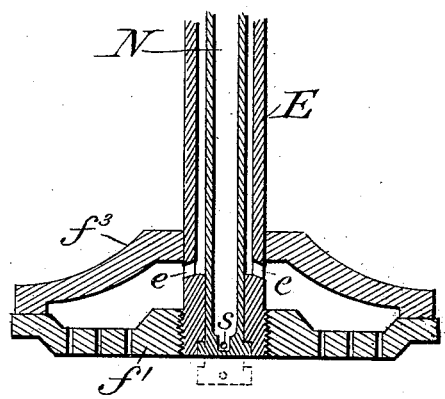

(No Model.)
2 Sheets—Sheet 1.
F. E. KEYES.
MACHINE FOR MOLDING PULP.
No. 410,977. Patented Sept. 10, 1889.
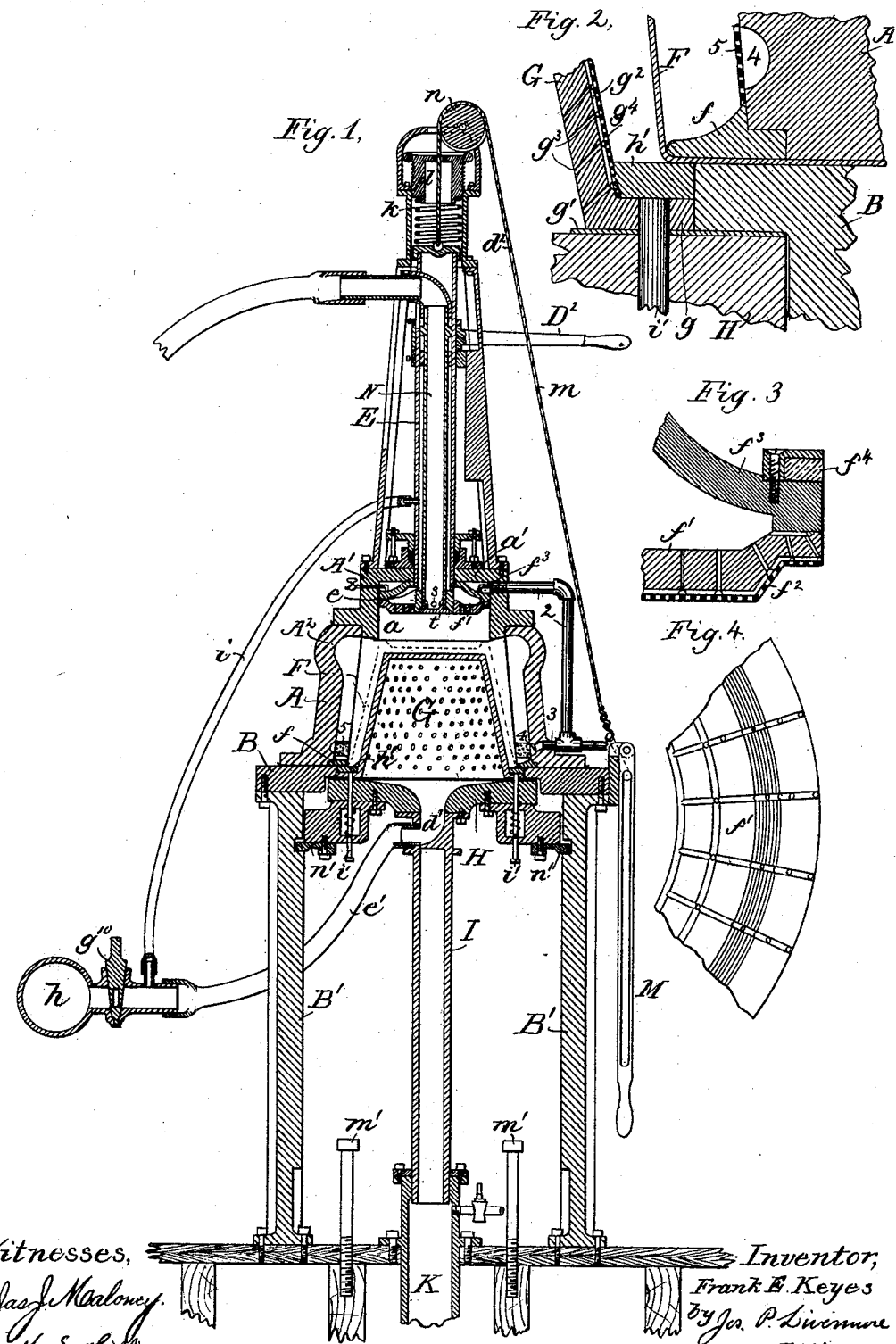
Witnesses,
Jas. J. Maloney.
M. E. Hill
Inventor,
Frank E. Keyes
by Jos. P. Livermore
Att'y (No Model.) 2 Sheets—Sheet 2.

F. E. KEYES.
MACHINE FOR MOLDING PULP.

No. 410,977. Patented Sept. 10, 1889.

Witnesses
F. H. Schott
Will L. Bryden

Inventor
Frank E. Keyes
By his Attorney
John C. Tasker

UNITED STATES PATENT OFFICE.

FRANK. EUGENE KEYES, OF PETERBOROUGH, ASSIGNOR OF ONE-HALF TO THE P. C. CHENEY COMPANY, OF MANCHESTER, NEW HAMPSHIRE.

MACHINE FOR MOLDING PULP.

SPECIFICATION forming part of Letters Patent No. 410,977, dated September 10, 1889.

Application filed June 8, 1887. Serial No. 240,621. (No model.)

*To all whom it may concern:*

Be it known that I, FRANK. EUGENE KEYES, of Peterborough, county of Hillsborough, State of New Hampshire, have invented an Improvement in Machines for Molding Pulp, of which the following description, in connection with the accompanying drawings, is a specification, like letters on the drawings representing like parts.

My invention relating to a machine for molding pulp is shown embodied in a machine for making pails from wood-pulp; but it is obvious that the invention may be embodied in machines for making other articles.

The invention is intended as an improvement on the machine shown in Letters Patent No. 354,708, granted to me December 21, 1886, which it closely resembles in construction in many parts, being the same in the means for introducing the pulp material between the mold and former and for operating the former to facilitate the removal of the molded article.

The present improvement relates mainly to the construction of the mold by which the pulp is compressed to the desired shape.

In my patent before referred to the mold was composed of a substantially cylindrical flexible partition or diaphragm that was forced laterally toward the sides of the former to mold and compress the sides of the pail or tub, and a rigid head connected with the said partition or diaphragm, which head acted upon and compressed the bottom of the pail or article to be molded. The rigid head and flexible diaphragm in that construction practically constituted a single tight chamber, and in the movement of the head away from the former the flexible side portion of the mold, or, in other words, the diaphragm, was stretched, and it had a corresponding contraction when the mold was being closed in upon or compressing the material to be molded. This stretching and contraction of the sides of the mold produce a drawing or rubbing action along the surface of the material being molded, instead of direct compression only; and the object of the present invention is to avoid such drawing or rubbing action and provide a mold in which the sides and end approach the former with a direct movement and act with direct pressure only upon the material to be molded.

The present invention consists in the construction, arrangement, and combination of parts, substantially as will be hereinafter pointed out in the description and then claimed.

Figure 6:
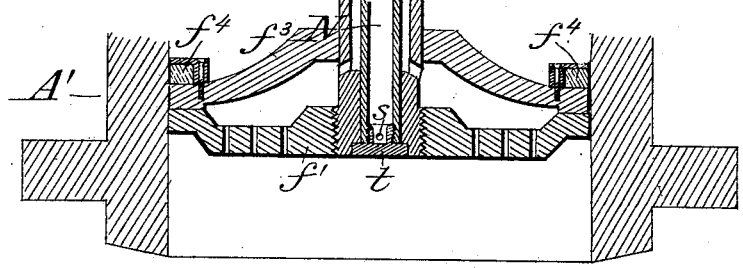

Figure 1 is a longitudinal section of a machine for molding articles from pulp, embodying this invention; Fig. 2, an enlarged sectional detail showing a portion of the former and co-operating parts; Figs. 3 and 4, details showing the construction of the end portion of the mold. Figs. 5 and 6 are detail views showing on an enlarged scale the relation and connection of the plunger, the head, and the tubes.

The main portion of the machine comprises a chamber embraced within the wall A, a supporting-base B therefor, the legs or uprights B', sustaining said base, and the movable platform or base H, supporting the former G, and itself supported on a plunger I, moving in a cylinder K, and the fastening devices $n'$, for the said former-support. All may be and are shown substantially the same as in my patent before referred to.

The former G is of usual construction, being a thick hollow shell, having a flange $g$, (best shown in Fig. 2,) by which it is bolted upon the supporting-base H, a gasket or washer $g'$ being fastened between the said former and base and extending out toward the edge of the latter, so as to make a tight joint between the part H and the base B when the former is locked in operative position, as will be understood from Fig. 2. The outer surface of the former G is scored or provided with numerous intersecting grooves $g^2$, (see Fig. 2,) which communicate with perforations $g^3$, that incline downward from the outer to the inner surface of the former, and afford drainage for the water that is removed from the pulp when being compressed against the former, which constitutes the support for the pulp while being molded or compressed by the contraction of the mold. The said former is provided with a covering $g^4$, (see Fig. 2,) preferably composed of finely-perforated metal plate made in the form of a hood or bonnet that fits over the entire outer surface of the former and rests at its lower edge within the retracting-ring $h'$, which is operated by rods $i'$ and stops $m'$ to detach the molded article from the former G after the latter has been lowered from the mold, all the foregoing parts being substantially as described in my said former patent.

In the present machine the chamber inclosed in the wall A, which contains the mold and former, is surmounted by a top piece A', provided with an internal cylinder $a$ of about the diameter desired for the end of the article to be molded.

The mold by which the material is compressed consists in part of a flexible side portion F, which may be a tubular piece of rubber having its lower edge confined between the lower edge of the chamber-wall A and its base B, while the upper edge of the side portion of the mold F is confined between the upper part of the chamber-wall A and its top or cover A'. The lower edge of the flexible side portion F of the mold draws over an annular foot-piece or ring $f$, (best shown in Fig. 2,) so that the said side piece F normally stands between the wall A of the chamber and the outer surface of the former G, as shown in Fig. 1, thus forming a flexible partition or diaphragm that divides the space between the chamber-wall and former, and may be moved either toward or from the latter, according as external or internal pressure is applied.

The end portion of the mold is composed of a perforated plate $f'$, connected with a head $f^3$, attached to the lower end of a tube E, extending up through a suitable stuffing-box in the end portion $a'$ of the cylinder $a$, and acted upon at its upper end by a spring $k$, the force of which is controlled by an adjustable follower $l$. The said tube E is connected with a cord $m$, passing over a pulley $n$ and connected with a slotted lever M, all constructed and operated substantially as in my patent before referred to.

The under surface of the end piece $f'$ of the mold is shaped to correspond with the shape desired for the end of the molded article, and the said surface is channeled or scored, as shown in Figs. 3 and 4, like the outer surface of the former G, the said channels being connected by perforations with the upper side of the piece $f'$, the under surface of which has applied to it a covering $f^2$, composed of a perforated plate, so that by this construction drainage outward is afforded through the end piece of the mold, the same as through the former G.

Above the piece $f'$ is placed a head or piston $f^3$, provided with suitable packing $f^4$, working tight in the cylinder $a$, said piston $f^3$ being connected with the tube E at a point some distance above the piece $f'$, and being recessed at its under side to form a chamber between it and the end piece $f'$ of the mold, the tube E being provided with small perforations $e$, communicating with the said space between the parts $f'$ $f^3$.

The tube E contains within it a second tube N, the lower end of which is closed by a plug $t$, and is provided with lateral openings $s$. The said tube N is movable lengthwise in the tube E, being operated by a handle $D^2$, and connected devices, which may be substantially the same as in my former patent. When the tube N is in its highest position in the tube E, the plug $t$ is even with the surface of the end piece $f'$ of the mold, forming part of the same; but by operating the tube N by the handle $D^2$ said tube N may be lowered, so as to bring the outlet opening or ports $s$ below the end piece $f'$ of the mold, and thus permit the introduction of the pulp material through the said pipe N and ports $s$ into the mold, the said pulp material being forced in so as to entirely fill the said space, expanding the side portion F of the mold outward toward or against the inner wall A of the chamber.

The arrangement of the pipes E and N, and means for operating them so as to introduce the pulp in the mold and to raise the end portion of the mold after the material has been shaped, are the same as in my former patent, before referred to, and are not herein claimed, but are merely shown as illustrating a convenient means for effecting these operations.

The space between the tubes N and E, which communicates through the openings $e$ with the space above the end piece $f'$ of the mold, is connected with a pipe $i$, and the base H for the former G is provided with an outlet-opening $d'$, connected with a pipe $e'$, which communicates with the pipe $i$, both being connected with a pipe $h$, which may communicate with an air-pump or other exhausting device; and it is intended that the pipes $e'$ and $i$ shall be placed in communication with the pipe $h$ by opening a stop-cock $g^{10}$ during the time that the pulp is being introduced through the pipe N, this suction tending to draw the water out from the pulp, and to thus partially condense the pulp material, and also acting to lay the fiber on the perforated surface $g^4$ and $f^2$ in such a manner as to make a stronger and more perfect material when the pulp is subsequently compressed, the molded articles, when the pulp is laid on in connection with an exhaust or suction, as just described, being of superior quality to those produced when the pulp is merely poured into the hollow of the mold.

The space in the cylinder $a$ above the piston $f^3$ is provided with an inlet-opening communicating with a pressure-pipe 2, provided with a branch 3, entering an inlet-recess 4 (best shown in Fig. 2) around the lower inner surface of the chamber-wall A, the said recess being covered by a strip 5 of perforated plate, as in my former patent. The said pipe 2 communicates with any suitable source of fluid under pressure—such, for example, as compressed air, water, or steam—and after the space around the former G and within the diaphragm H and in the cylinder $a$ below the end piece $f'$ of the mold has been filled with pulp through the pipe N, and the said pipe lifted back to its normal position, pressure is admitted through the pipe 2, acting above the piston $f^3$, to force it and the end piece $f'$ of the mold downward toward the former and through the branch 3 into the chamber A outside the portion F of the mold, which is thereby at the same time forced laterally toward and compresses the pulp against the sides of the former, the said parts of the mold being at the end of the operation in the position shown in dotted lines, and having compressed the pulp to the shape desired for the article. Before the pressure is admitted through the pipe 2 the lever M will be raised, so as to permit the downward movement of the end piece $f'$ of the mold, and after the compression has been completed, as just stated, the compressing-fluid may be drawn off through the pipes 2 3, preferably by the employment of a three-way cock, which opens an outlet at the same time that it cuts off the pressure from the pipes 2 3. The suction or exhaust from the pipes $e'$ and $i$, which is continued during the compression of the pulp, is also cut off after the compression and molding of the article has been completed. When the pressure is thus removed, the end piece $f'$ of the mold may be raised to the position shown in Fig. 1 by turning down the lever M, and the side portion $f$ of the mold will draw back by its own elasticity from the outer surface of the molded article, and then the base-piece H, for the former G, may be unlocked and lowered, carrying the molded article down with it, and at the end of the downward movement the molded article will be raised off from the former by the ring $h'$, pins $i'$, and stops $m'$, so that the said molded article may be easily removed from the apparatus, after which the former is again raised by admitting pressure to the cylinder K, and then locked in its highest position by the device $n'$, and the operations for molding another article repeated, as already described.

While the apparatus has been described as if the article to be molded and consequently the former and mold were circular in horizontal section, it is obvious that this is not necessarily the case, and that the invention is equally applicable to produce articles of various other shapes.

I have found it desirable to enlarge the chamber A at the upper part, as represented at $A^2$, so as to receive a larger quantity of pulp at this point, so that when the entire mass is compressed the chime, and lower portion of the pail adjacent thereto, is of fully equal if not somewhat greater thickness and density than the remainder of the pail, it being understood that when the pulp is introduced the flexible former expands outward, so as to lie along the inner surface of the chamber A.

The said chamber may be provided with a small vent-passage controlled by a suitable stop-cock, as is also the cylinder A' above the head or follower that works in it.

This invention is not limited to the specific machine herein shown and described, which is adapted for molding hollow articles upon a former that supports the pulp while being compressed or molded to form said article; but it is obvious that the flexible diaphragm and the movable end piece may co-operate with other supports for the pulp while it is being molded, and this will be the equivalent of the former G.

The novel process of applying suction to the pulp while it is being introduced into the mold is the subject of another application for Letters Patent, filed November 21, 1887, Serial No. 255,792.

I claim—

1. The combination of the former, the chamber inclosing the same and provided with a cylinder located above the former, the flexible partition or diaphragm surrounding the former and connected at the ends with said chamber, the independently-movable end piece operated in said cylinder, and means for operating said end piece and diaphragm, substantially as described.

2. The combination of the former, the chamber inclosing the same and provided with a cylinder located above the former, the flexible partition or diaphragm surrounding the former, and the piston having a working fit in said cylinder, and a perforated piece fitted in said cylinder and connected with said piston, a chamber or recess between said piston and perforated piece, and means for producing suction in the said chamber, substantially as described.

3. In a pulp-molding machine, the combination of a former to support the material while being acted upon, a flexible partition surrounding the former, an outer chamber A, provided at its upper end with an enlargement $A^2$ to admit of an increased deposit of material on the former opposite the same, and means for forcing fluid in said chamber, to apply pressure to the material on the former through the flexible partitions, substantially as described.

In testimony whereof I have signed my name to this specification in the presence of two subscribing witnesses.

FRANK. EUGENE KEYES.

Witnesses:
 JOS. P. LIVERMORE,
 M. E. HILL.